Nov. 22, 1927.  
W. R. MITTENDORF  
1,650,225  
COMPUTING SCALE  
Filed July 30, 1923  
2 Sheets-Sheet 1

Fig-1.

INVENTOR.  
WM. R. MITTENDORF.  
Edward L. Reed ATTORNEY.

Patented Nov. 22, 1927.

1,650,225

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COMPUTING SCALE.

Application filed July 30, 1923. Serial No. 654,637.

This invention relates to computing scales.

One object of the invention is to provide an automatic scale having an indicating member, or chart, which will be moved in a straight line and the movement of which will be divided into equal divisions for equal increments of weight on the platform of the scale.

A further object of the invention is to provide such a scale in which the indicating member and its supporting and actuating parts will be so mounted that the moving parts may be substantially free from friction.

A further object of the invention is to provide such a scale in which the parts which support the indicating member will be movable about a fixed axis and will be so mounted on said axis that the weight of the supporting parts will be neutralized so that it will not interfere with or influence the correct movement of the indicating member under the influence of the load.

Other objects of the invention will appear as the device is described in detail.

In the accompanying drawings

In these drawings I have illustrated one embodiment of my invention and have shown the same, for the purposes of illustration, as applied to a counting scale comprising intersecting indicating members influenced respectively, by a load balance and by a unit balance, as shown and described in my application for patent filed September 23, 1922, Serial No. 590,085. Briefly this computing and indicating mechanism comprises two elongated indicating members one of which is in the form of a chart having a longitudinal series of value graduations and the other of which is pivotally supported and, when the device is in its zero position, extends parallel with the chart. One of these indicating members, in the present instance, the pivoted indicating member, is actuated by the unit balance to establish a unit of computation and the other indicating member, in the present instance the chart, is moved under the influence of the load on the load platform a distance corresponding to the weight of the load. The two indicating members are thus brought into intersecting positions and the graduation at the point of intersection represents the result of the computation. It will be understood, however, that the invention is not confined to counting scales but may be applied to computing scales of various kinds and either one of the indicators may be controlled by the load balance and the other may be adjusted in any suitable manner.

In that particular embodiment of the invention here shown, the scale comprises a main frame consisting of a base 1 and upright standards 2 and 3 connected at their upper ends by parallel bars 4 and 5 and also connected at intermediate points by parallel bars 6 and 7. A load balance comprising a main lever 8 is pivotally mounted on standards 9 extending upwardly from the base 1 and is provided with a load platform or receptacle 10. The lever 8 is here shown as a lever of the first principle but it will be understood that it may be of any suitable character. In the present instance this load balance controls the operation of the indicating chart and I have mounted the chart, as shown at 11, upon a supporting member or lever 12 which is pivotally mounted on a swinging structure 13, which in turn is mounted for movement about a fixed axis and is operatively connected with the lever 8. In the form here shown, the swinging structure 13 is in the form of an arm or rod secured to and extending upwardly from a hub 14 having secured thereto a pivot pin 15 having knife edges mounted in bearings formed in plates 16 depending from the bars 6 and 7. Mounted on the hub 14 for adjustment about the axis thereof is a plate 17 which, in the present instance, is provided with a series of slots through which extend screws 19 which enter the end of the hub and support the plate thereon. The screws do not clamp the plate to the hub but leave it free for a limited movement about the axis of the hub and relatively to the hub.

Rigidly secured to the plate 17 is a cam 20 the position of which, with relation to the hub, is determined by an adjustable stop here shown as a screw 21 mounted in a lug 22 projecting from the hub and arranged to engage the edge of the cam, or the plate, and thus determine the position of the cam with relation to the hub. The cam is connected by means of a ribbon 23 with the nose piece 24 for the main lever 8 of the load balance, the ribbon having in its lower end a stirrup 25 having a bearing to receive a needle point 26 carried by the nose piece. The ribbon is not secured directly to the cam but is secured to the hub, in the present device, by means of a clamping plate 27, and merely bears upon the periphery of the cam, the tension of the ribbon on the cam serving to hold the latter in contact with the adjustable stop 21. The hub is provided with a pendulum which counterbalances the weight of the main lever 8 and its associated parts and serves to actuate the hub and its connected parts when the nose end of the lever 8 is shifted by a load on the load platform 10. As here shown, this pendulum is in the form of a weight 28 adjustably mounted on a rod 29 anchored in the hub 14 and is held in adjusted positions on the rod by means of a set screw 30, and its counterbalancing action is that of a reverse pendulum which descends as the load is applied to the main lever. Obviously the mechanism may, if desired, be so arranged that the counterbalancing action of the weight 28 will be that of a rising pendulum which opposes the weight of the load on the platform.

Figure 1:
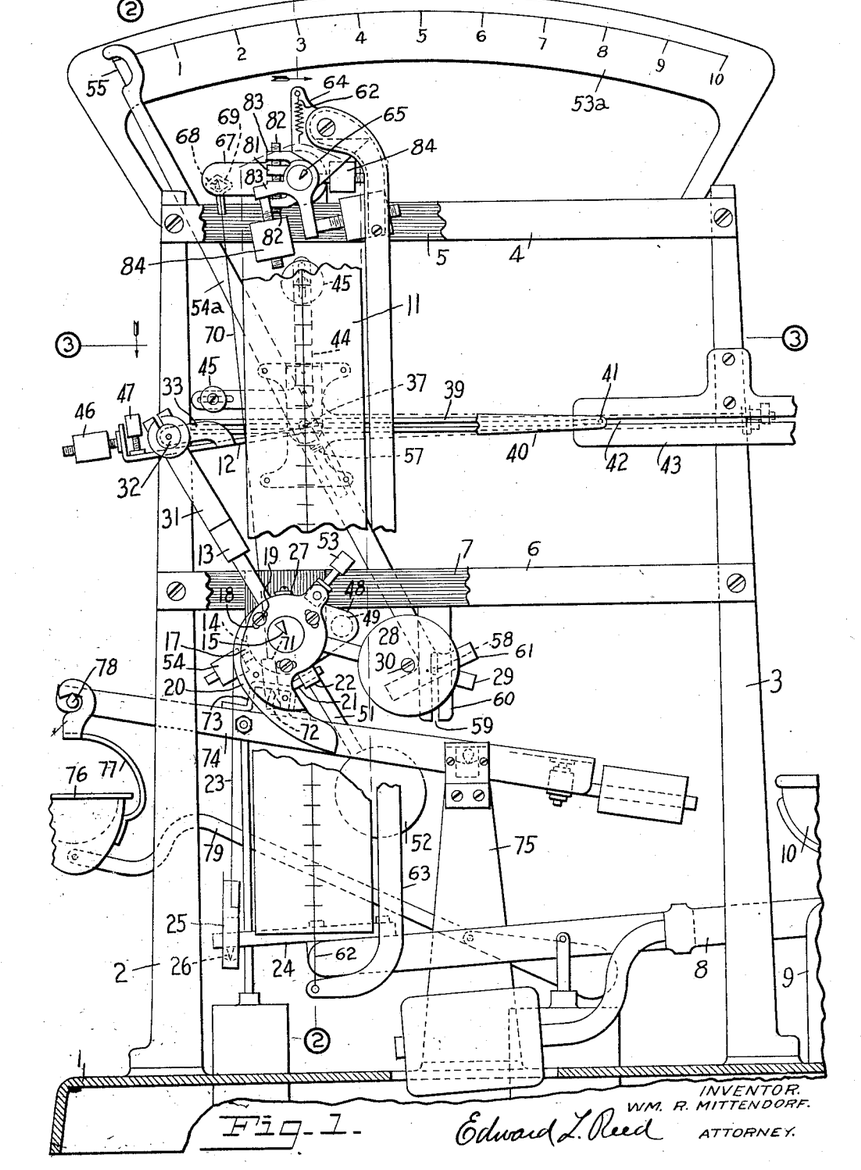
Fig. 1 is a front elevation, partly broken away, of a scale embodying my invention.
Figures 2, 4, 5, 6, 7:
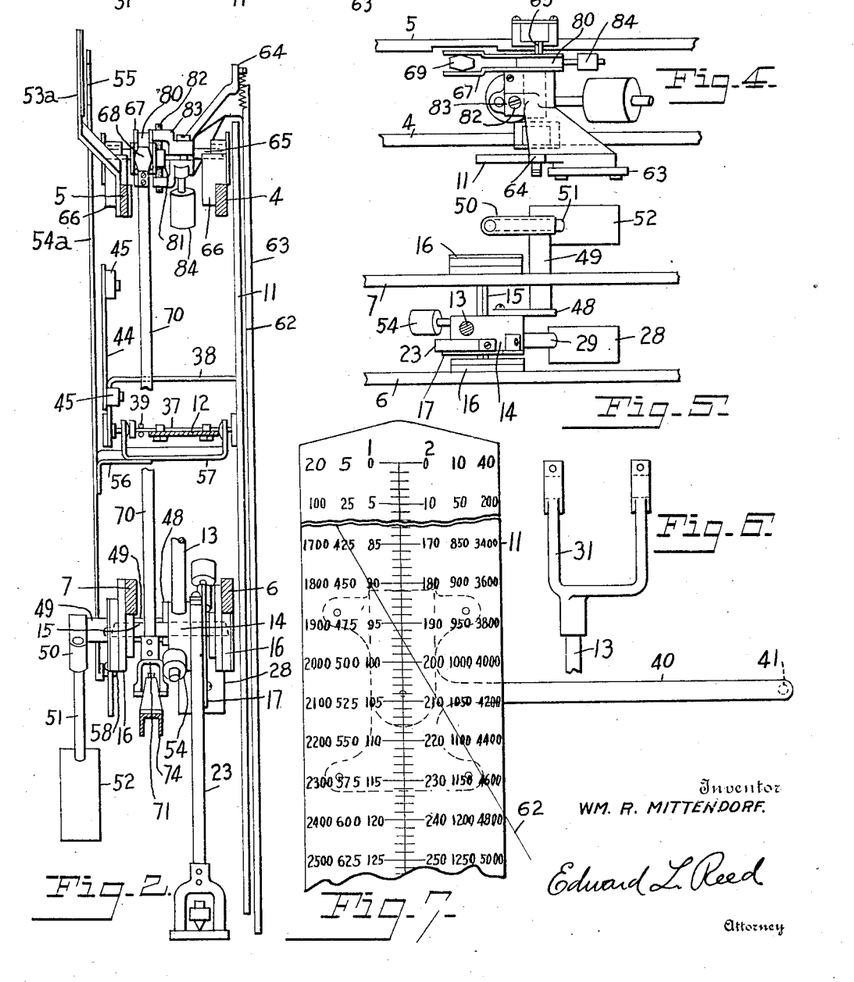
Fig. 2 is a sectional view taken on the line 2—2 of Fig. 1, looking in the direction of the arrows.
Fig. 4 is a plan view of the supporting and actuating mechanism for the pivoted indicating member.
Fig. 5 is a plan view of the hub unit of the main supporting arm.
Fig. 6 is a detail view of the yoke on which the supporting lever is pivotally mounted.
Fig. 7 is a detail view of portions of the cooperating indicating members.
Figure 3:
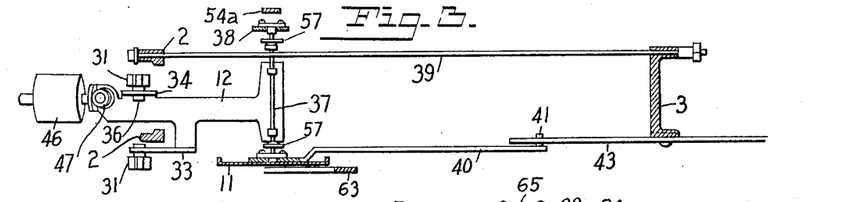
Fig. 3 is a section taken on the line 3—3 of Fig. 1.

The arm 13 which extends upwardly from the hub 14 has rigidly secured thereto and forming a part thereof a yoke shaped bearing bracket 31 each arm of which is provided with a suitable bearing. In the present instance I have utilized ball bearings, as shown at 32. Pivotally mounted on the yoke is a lever 12 which is provided near one end thereof with suitable trunnions which are journaled in the ball bearings 32. As here shown the lever is formed of sheet metal and has upturned ears 33 and 34 in which are mounted studs or trunnions 36 which engage the bearings. The chart 11 is pivotally mounted on the lever 12 at a point spaced from the axis of the lever and, in the form illustrated, the lever is provided near the right hand end thereof, in Figs. 1 and 3, with a shaft 37 the ends of which extend beyond the sides of the lever. The chart is rigidly secured to a yoke shaped bracket 38 the ends of which are provided with bearings to engage the ends of the shaft 37. To compel the movement of the chart in a straight line I have provided a suitable guide for the shaft 37 which, in the present construction, consists of two bars or light rods 39 mounted at their ends on the upright standards 2 and 3 and drawn taut so as to form a perfectly straight guideway between them and the shaft 37 extends through this guideway and travels therein when oscillating movement is imparted to the movable member 31 on which the lever is supported. It is also desirable to provide means for maintaining the chart 11 in a true vertical position at all times during the movement thereof, it being apparent that the position of the lever 12 with relation to the chart will change constantly during the movement of the lever. To this end I have connected with the chart a part adapted to travel along a fixed guide and thereby control the position of the chart. This guide and its cooperating part may be of any suitable character but preferably one of said members has a slot or groove into which the other member extends and the walls of which hold the movable part against lateral displacement. In the present construction the bracket 38 is provided with an arm 40 the outer end of which has mounted therein a pin 41 which enters and travels in a guideway 42 formed in a bracket 43 rigidly secured to the main frame of the machine, this guideway extending exactly parallel with the line of the movement of the chart.

The chart 11 is preferably provided with means whereby its center of gravity may be established at the axis thereof, thus permitting the pin 41 to float in the slot 42 and eliminating frictional contact between the pin and the walls of the slot. As here shown, the yoke shaped bracket 38 is provided with arms 44 on which are adjustably mounted weights 45 by means of which the center of gravity may be established in a desired location. The lever 12 is also provided with means for establishing the center of gravity of the same, and the parts supported thereby, at the axis of the lever, thus concentrating the weight at the axis and also eliminating friction between the shaft 37 and the guide rods 39. In the present construction the lever 12 extends a short distance outwardly beyond its axis and has mounted thereon adjustable weights 46 and 47 by means of which the center of gravity may be established at the desired point. In this manner the bearing for the indicating member, or chart, is so buoyed up and free to move as to constitute in effect a floating bearing. The hub unit which carries the swinging arm 13 may, if desired, be provided with means for establishing the center of gravity of the hub unit and its associated parts, with the exception of the pendulum and the cam, at the axis of the hub. This is not essential to the proper operation of the mechanism, but when desirable it is preferably accomplished by providing the hub with suitable adjustable weights and, in the present instance, I have found it desirable to locate the main counterbalancing weight beyond one end of the hub in order that a weight of suitable size may be employed and that this weight may be spaced the desired distance from the hub without interfering with any other part of the mechanism. As here shown, I have mounted on the hub a bracket 48 having secured thereto a transversely extending member or rod 49 provided at its outer end with an arm 50 in which is rigidly mounted a rod 51 having on its outer end an adjustable weight 52. A laterally extending adjustable weight 54 may be also provided to facilitate the correct adjustment of the center of gravity. I have also provided means for counterbalancing the cam so as to enable the center of gravity of the unit consisting of the plate 17 and the cam 20 to be established at the axis of the hub to the end that the adjustment of the plate 17 with relation to the hub will not disturb the center of gravity of the hub unit as a whole as it has been established by the weights 52 and 54. As here shown this means consists of a weight 53 mounted on a screw threaded rod which is rigidly secured to the plate 17. By the adjustment of these weights the center of gravity of the hub unit and the several parts carried thereby, with the exceptions above noted, is established at the axis of the hub and consequently the weight of the hub unit and its associated parts is neutralized so that it will not interfere with or influence in any way the counterbalancing action of the pendulum, the counterbalancing action of the pendulum being thus rendered wholly independent of all other elements. It will be noted that in this assembly each individual pivoted element is balanced about its axis, that is, the center of gravity is established at the axis, and that the complete assembly is balanced at the axis of the hub unit. In this manner I am enabled to eliminate practically all friction between the stud 40 and the walls of the guideway 42 and between the shaft 37 and the guide rods 39 and, by thus balancing the complete assembly, to neutralize the weight of the assembly so that it will not in any way influence the action of the pendulum.

In the particular scale here shown I have provided means for indicating the weight of the load on the load platform simultaneously with the indication of the result of the computation and to this end I have mounted on the main frame of the scale a stationary weight chart 53ª and have provided an indicator arm 54ª having an indicator wire 55 which travels over the chart 53. This indicator arm is pivotally mounted on the shaft 37, preferably by securing the same to a bracket 56 carried by the yoke shaped structure 57, the arms of which are provided with bearings which engage the shaft 37. The lower end of the lever extends below the shaft 37 and is provided with a pin 58 which travels in a vertical slot 59 formed in a bracket 60 secured to and depending from the transverse bar 7. This pin and slotted structure serve to hold the lower end of the lever against transverse movement when the supporting lever 12 is operated and thus causes the indicating wire 55 to be carried along the weight chart as the computing chart 11 moves transversely to the scale. The indicator arm 54 has its center of gravity established at its axis so that the weight is concentrated at that point and friction between the stud 58 and the walls of the slot 59 is eliminated. As here shown, the indicator arm is not provided with adjustable weights but has laterally extending projections or pads 61 which may be filed or otherwise cut away to accurately establish the center of gravity at the axis of the arm.

The pivoted indicating member is here shown as comprising an indicator wire 62 connected at its ends to a supporting structure 63, the upper portion of which comprises a member 64 rigidly secured to a pivot pin 65 having knife edge portions engaging bearings formed in plates 66 carried by the frame members 4 and 5. Connected with this member 64 is an arm 67, the outer end of which is provided with a knife edged pivot 68 engaging a bearing in a stirrup 69 attached to the upper end of a ribbon 70 the lower end of which is provided with a stirrup 71 having a bearing to receive a needle point 72 carried by a bracket 73 rigidly secured to the main lever 74 of a unit balance, which lever is pivotally mounted on standards 75 carried by the base 1. In the present arrangement of the mechanism this lever is of the second principle but it may be of any suitable character. Supported from the outer end of the lever is a unit receptacle 76 which, in the present instance, is carried by a holder 77 pivotally connected with the lever 78. A check link 79 is connected at one end with the carrier 77 and at the other end of one of the standards 75 to maintain the unit receptacle in an established position with relation to the lever. The arm 67 is preferably adjustably connected with the member 64 of the indicator support and, as here shown, the arm consists of two members connected to a hub 80 loosely mounted on the pivot pin 65 having a lateral projection 81 which extends between two adjustable stops or set screws 82 screw threaded into lugs 83 and rigidly secured to the member 64. This member 64 is also provided with counterbalancing weights 84 by means of which the center of gravity of the pivoted indicator may be established with relation to the axis thereof. In the present instance, the center of gravity is established at a point spaced from the axis so that the assembled unit becomes in effect a pendulum to counterbalance the load in the unit receptacle. In this manner I have provided a counterbalance for the weight of the unit, the action of which is that of a rising pendulum but which obviously may be of any desired character.

The operation of the device will be readily understood from the foregoing description of the several parts thereof and it will be apparent that I have provided a computing scale in which the computing chart will move in a straight line and in which the divisions of movement of said chart will be equal for equal increments of weight on the load platform. Further, it will be apparent that by so balancing the several pivoted elements of the chart supporting and controlling mechanism as to establish the centers of gravity at the respective axes thereof, I have eliminated frictional contact between the moving parts and the guides therefor and have so concentrated the load on the axis of the main hub unit that the weight of the assembly is neutralized and will not effect the action of the pendulum and its associated parts. Further, it will be apparent that the mechanism is simple in construction and that it will be accurate in its computations.

While I have shown and described one embodiment of my invention I wish it to be understood that I do not desire to be limited to the details thereof as various modifications may appear to a person skilled in the art.

Having now fully described my invention what I claim as new and desire to secure by Letters Patent, is:

1. In a scale, a movable supporting member, a device pivotally mounted on said supporting member and movable therewith, a structure having a guideway, and a part connected with said pivoted device and traveling in said guideway, said device having its center of gravity established at the axis thereof, thereby eliminating frictional contact between said part and the walls of said guideway.

2. In a scale, a movable supporting member, a device pivotally mounted on said supporting member and movable therewith, a structure having a guideway, a part connected with said pivoted device and traveling in said guideway, and means for establishing the center of gravity of said device at the axis thereof, thereby eliminating friction between said part and the walls of said guideway.

3. In a scale, a weight actuated member, a chart supporting member, means controlled by said weight actuated member for actuating said supporting member, a chart pivotally mounted on said supporting member, a structure having a guideway, a part connected with said chart and traveling in said guideway, and means for establishing the center of gravity of said chart at the axis thereof, thereby eliminating friction between said part and said guideway.

4. In a scale, a weight actuated member, a chart supporting member, means controlled by said weight actuated member for actuating said chart supporting member, a frame pivotally mounted on said chart supporting member, a chart rigidly secured to said frame, weights adjustably mounted on said frame to establish the center of gravity of said chart, an arm carried by said frame, a pin extending laterally from said arm, and a structure having a guideway in which said pin travels.

5. In a scale, a movable structure, a supporting member pivotally mounted on said structure, an indicating member pivotally mounted on said member, means for establishing the center of gravity of said supporting member and the member carried thereby at the axis of said supporting member, and means for actuating said movable structure.

6. In a scale, a movable structure, a supporting member pivotally mounted on said structure, an indicating member pivotally mounted on said member and having its center of gravity established at the axis thereof, means for establishing the center of gravity of said supporting member and the member carried thereby at the axis of said supporting member, and means for actuating said movable structure.

7. In a scale, a movable structure, a supporting member pivotally mounted on said structure, an indicating member pivotally mounted on said member, a structure forming a guide, a part connected with said indicating member and traveling along said guide, means for establishing the center of gravity of said indicating member and its connected parts at the axis thereof, means for establishing the center of gravity of said supporting member and the member carried thereby at the axis of said supporting member, and means for actuating said movable structure.

8. In a scale, a movable structure, a supporting lever pivotally mounted thereon, an indicating member pivotally mounted on said lever on an axis spaced from the axis of said lever, means for establishing the center of gravity of said lever at the axis thereof, and means for actuating said movable structure.

9. In a scale, a movable structure, a supporting lever pivotally mounted thereon, a plurality of indicating members pivotally mounted on said lever and each having its center of gravity established at the axis thereof, means for establishing the center of gravity of said lever at the axis thereof, and means for actuating said movable structure.

10. In a scale, a movable structure, a supporting lever pivotally mounted thereon, an indicating member pivotally mounted on said lever on a transverse axis spaced from the axis of said lever, means for causing the axis of said indicating member to move in a straight line, means for establishing the center of gravity of said supporting lever at the axis thereof, and means for actuating said movable structure.

11. In a scale, a movable structure, a supporting lever pivotally mounted thereon, a transverse shaft mounted on said lever and spaced from the axis thereof, an indicating member pivotally supported by said shaft, a structure having a guideway extending transversely to said indicating member and embracing said shaft, means for establishing the center of gravity of said lever at the axis thereof, and means for actuating said movable structure.

12. In a scale, a movable structure, a supporting lever pivotally mounted thereon, a transverse shaft mounted on said lever and spaced from the axis thereof, an indicating member pivotally supported on said lever, a structure having a guideway extending transversely to said indicating member and embracing said shaft, a second structure having a guideway extending parallel with the guideway of the first mentioned structure, an arm secured to said indicating member and having a part arranged to travel in the last mentioned guideway, means to establish the center of gravity of said indicating member at its axis, means to establish the center of gravity of said lever and the parts carried thereby at the axis of said lever, and means to actuate said movable structure.

13. In a scale, a frame, a weight actuated member mounted on said frame, a movable structure pivotally mounted on a fixed axis on said frame, a supporting lever pivotally mounted on said movable structure, a shaft mounted on said lever and extending beyond the lateral edges thereof, a chart pivotally supported on said shaft, guide rods extending transversely to said chart and embracing said shaft, a structure mounted on said frame and having a guideway formed therein, an arm secured to said shaft and having a pin arranged to travel in said guideway, means to establish the center of gravity of said chart at the axis thereof, means to establish the center of gravity of said lever and the parts carried thereby at the axis of said lever, and means for actuating said movable structure.

14. In a scale, a movable structure mounted on a fixed axis, a lever pivotally mounted on said structure, a chart pivotally mounted on said lever, means to guide said chart in a straight line and to retain said chart in a vertical position, means to establish the center of gravity of said chart at the axis thereof, means to establish the center of gravity of said lever at the axis of said lever, and means to establish the center of gravity of said movable structure at the axis thereof.

15. In a scale, a movable structure mounted on a fixed axis, a lever pivotally mounted on said movable structure, a chart pivotally mounted on said lever, means for establishing centers of gravity of said chart and said lever at their respective axes, and means for establishing the center of gravity of the complete assembly at the axis of said movable structure.

16. In a scale, a weight actuated member, a hub structure mounted on a fixed axis, and operatively connected with said weight actuated member, a pendulum connected with said structure, an arm carried by said hub structure, a lever pivotally mounted on said arm, a chart pivotally mounted on said lever, and means to neutralize the weight of said parts at the axis of said hub structure to prevent interference thereby with the action of said pendulum.

17. In a scale, a weight actuated member, a hub unit comprising a hub member mounted on a fixed axis, a cam connected with said hub member, a ribbon connected with said hub member, extending about said cam and connected with said weight actuated member, a pendulum connected with said hub member, an arm rigidly secured to said hub member, a lever pivotally mounted on said arm, a chart pivotally mounted on said lever, means to guide the axis of said chart in a straight line when movement is imparted to said arm, means to hold said chart against movement about its axis, and means to establish the center of gravity of said hub unit with its associated parts at the axis of said hub member.

18. In a scale, a weight actuated member, a hub mounted on a fixed axis, a cam connected with said hub, a ribbon engaging said cam and connected with said weight actuated member, a pendulum connected with said hub, an arm rigidly mounted on said hub, a lever pivotally mounted on said arm, a chart pivotally mounted on said lever, a bracket secured to said hub, a transversely extending member secured to said bracket, an arm secured to said transversely extending member, and an adjustable counterbalancing weight carried by the last mentioned arm.

19. In a scale, a structure movable about a fixed axis, a lever pivotally mounted on said structure, an indicating member pivotally mounted on said lever, and means to cause said indicating member to move in a straight line when movement is imparted to said movable structure.

20. In a scale, a weight actuated member, a hub connected with said weight actuated member, a pendulum connected with said hub, an arm carried by said hub, a lever pivotally mounted on said arm, a chart pivotally mounted on said lever.

21. In a scale, a weight actuated member, a hub connected with said weight actuated member, a pendulum for said hub, an arm secured to said hub, a lever pivotally mounted on said arm, a chart pivotally mounted on said lever, means for guiding the axis of said chart in a straight line, an indicating member, a supporting structure therefor, a pivot pin rigidly connected with said supporting structure, bearings for said pivot pin, an arm connected with said structure, a unit receptacle mounted for movement, and an operative connection between said unit receptacle and the arm which is connected with said supporting member of said indicator.

22. In a scale, a weight actuated member, a hub unit comprising a cam adjustably mounted thereon, a ribbon bearing on said cam and connected with said weight actuated member, a pendulum connected with said hub unit, an arm rigidly secured to said hub unit, a lever pivotally mounted on said arm, a chart pivotally mounted on said lever and movable in a straight line, an indicating member to cooperate with said chart, a supporting structure for said indicating member, a pivot pin rigidly secured to said supporting structure, bearings for said pivot pin, an arm loosely mounted on said pivot pin having a laterally extending lug, stops engaging said lug to control the position of said arm with relation to said supporting structure, a unit receptacle mounted for movement, and means for operatively connecting said unit receptacle with the last mentioned arm.

23. In a scale, a structure movable about a fixed axis, a lever pivotally mounted on said structure, a computing chart pivotally mounted on said lever and having a center of gravity established at the axis thereof, means for causing said axis of said chart to move in a straight line, a weight indicating member pivotally mounted on said lever and having its center of gravity established at the axis thereof, means for establishing the center of gravity of said lever at its axis, and means for establishing the center of gravity of said movable structure and the parts supported thereby at the axis of said movable structure.

24. In a scale, a movable structure pivotally mounted on a fixed axis, a supporting member pivotally mounted on said structure, an indicating member pivotally mounted on said supporting member, and means to establish the center of gravity of said movable structure and the parts carried thereby at the axis of said structure.

25. In a scale, a movable structure pivotally mounted on a fixed axis, a supporting member pivotally connected with said structure, an indicating member pivotally mounted on said supporting member, and means to actuate said movable structure.

26. In a scale, a movable structure pivotally mounted on a fixed axis, a lever pivotally mounted on said structure, and an indicating member pivotally mounted on said lever.

27. In a scale, a movable structure pivotally mounted on a fixed axis, a lever pivotally mounted on said structure, an elongated chart pivotally mounted on said lever, and means to cause said chart to travel in a straight line extending transversely to the length thereof.

28. In a scale, a movable structure pivotally mounted on a fixed axis, a lever pivotally mounted on said structure, an elongated chart pivotally mounted on said lever, means to cause said chart to travel in a straight line extending transversely to the length thereof, and means to establish the center of gravity of said movable structure and the parts carried thereby at the axis of said structure.

29. In a scale, a movable structure, a supporting member pivotally mounted on said structure, a part of a computing device pivotally mounted on said member, means for establishing the center of gravity of said supporting member and the part carried thereby at the axis of said supporting member, and means for actuating said movable structure.

30. In a scale, a movable structure, a supporting member pivotally mounted on said structure, a part of a computing device pivotally mounted on said member and having its center of gravity established at the axis thereof, means for establishing the center of gravity of said supporting member and the part carried thereby at the axis of said supporting member, and means for actuating said movable structure.

31. In a scale, a movable structure, a supporting lever pivotally mounted thereon, a part of a computing device pivotally mounted on said lever on an axis spaced from the axis of said lever, means for causing the axis of said part of said computing device to move in a straight line, means for establishing the center of gravity of said supporting lever at the axis thereof, and means for actuating said movable structure.

32. In a scale, a movable structure pivotally mounted on a fixed axis, a supporting lever pivotally mounted on said structure, a part of a computing device pivotally mounted on said lever, and means to establish the center of gravity of said movable structure and the parts carried thereby at the axis of said structure.

33. In a scale, a movable structure mounted on a fixed axis, a lever pivotally mounted on said structure, a part of a computing device pivotally mounted on said lever, means to guide said part in a straight line, means to establish the center of gravity of said part of said computing device at the axis thereof, means to establish the center of gravity of said lever at the axis of said lever, and means to establish the center of gravity of said movable structure at the axis thereof.

34. In a scale, a weight actuated member, a pivoted indicating member having a floating axis, means for regulating the path of movement of said axis, and means controlled by said weight actuated member for actuating said indicating member, said last mentioned means being arranged to eliminate friction between said indicating member and said movement regulating means.

35. In a scale, a weight actuated member, a pivoted indicating member having a floating axis, means for regulating the paths of movement of said axis and said indicating member, and means controlled by said weight actuated member for actuating said indicating member and for eliminating friction from said movement regulating means.

36. In a scale, a weight actuated member, a floating bearing, an indicating member carried by said floating bearing, means for guiding said bearing in a definite path, and means controlled by said weight actuated member for imparting movement to said floating bearing and for eliminating friction from said guiding means.

37. In a scale, a weight actuated member, an indicating member, a floating bearing to support said indicating member, means controlled by said weight actuated member for imparting movement to said bearing, means for guiding said bearing in a definite path, and means for controlling the position of said indicating member relative to said bearing.

38. In a scale, a weight actuated member, a floating bearing, an operative connection between said weight actuated member and said bearing, means to cause said bearing to be moved in a definite path, and an indicating member supported by said bearing.

39. In a scale, a weight actuated member, a floating bearing, an operative connection between said bearing and said weight actuated member, means to cause said bearing to be moved in a definite path, an indicating member supported by said bearing, and means for controlling the position of said indicating member relative to said bearing.

40. In a scale, a weight actuated member, a pivoted indicating member having a floating axis, means for counterbalancing said weight actuated member and for operatively connecting said indicating member therewith, means for regulating the path of movement of the axis of said indicating member, and means for eliminating friction from said movement regulating means.

41. In a scale, a weight actuated member, a pivoted indicating member having a floating axis, means for counterbalancing said weight actuated member and for operatively connecting said indicating member therewith, means for regulating the path of movement of the axis of said indicating member and the movement of said indicating member about said axis, and means for eliminating friction from said movement regulating means.

42. In a scale, a weight actuated member, a pivoted indicating member having a floating axis, means for counterbalancing said weight actuated member and for operatively connecting said indicating member therewith, cooperating members to guide said axis in a definite path, and means to prevent frictional contact between said cooperating members.

43. In a scale, a movable supporting member, a device pivotally mounted on said supporting member and movable therewith, a guide, and a part connected with said pivoted device and traveling along said guide, said device having its center of gravity established at the axis thereof, thereby eliminating friction between said part and said guide.

44. In a scale, a movable supporting member, a device pivotally mounted on said supporting member and movable therewith, a guide, and a part connected with said pivoted device and traveling along said guide, and means for establishing the center of gravity of said device at the axis thereof, thereby eliminating friction between said part and said guide.

45. In a scale, a weight actuated member, a chart supporting member, means controlled by said weight actuated member for actuating said supporting member, a chart pivotally mounted on said supporting member, a guide, a part connected with said chart and arranged to travel along said guide, and means for establishing the center of gravity of said chart at the axis thereof.

46. In a scale, a weight actuated member, a chart supporting member, means controlled by said weight actuated member for actuating said chart supporting member, a frame pivotally mounted on said chart supporting member, a chart rigidly secured to said frame, weights adjustably mounted on said frame to establish the center of gravity of said chart, an arm carried by said frame, a guide, and a part carried by said arm and arranged to travel along said guide.

47. In a scale, a movable structure, a supporting lever pivotally mounted thereon, an indicating member pivotally mounted on said lever on a transverse axis spaced from the axis of said lever, means for causing the axis of said indicating member to move in a straight line, a guide extending parallel with the line of movement of said indicating member, an arm secured to said indicating member and having a part arranged to travel along said guide, means to establish the center of gravity of said indicating member at its axis, means to establish the center of gravity of said lever and the parts carried thereby at the axis of said lever, and means to actuate said movable structure.

48. In a scale, a pivoted structure, a lever pivotally mounted on said structure, and an indicating member carried by said lever.

49. In a scale, a movable bearing, an indicating member pivotally mounted upon said bearing, means comprising a guideway to control the pivotal action of said member, and means to remove friction from said controlling means.

50. In a scale, a movable bearing, a supporting member pivotally mounted on said bearing, means comprising a guideway to control the pivotal action of said member, and means to remove friction from said controlling means.

51. In a scale, a movable structure pivotally mounted upon a fixed axis, a supporting member pivotally mounted upon said structure but movable therewith, an indicating member pivotally mounted on said supporting member, means to control the pivotal action of said members, and means to remove friction from said controlling means.

52. In a scale, a movable bearing, a supporting member pivotally mounted on said bearing, cooperating parts comprising a guideway to control the pivotal action of said member, and means to eliminate friction between said cooperating parts.

53. In a scale, a movable structure pivotally mounted on a fixed axis, a supporting member pivotally mounted on said structure and movable therewith, an indicating member pivotally mounted on said supporting member, and cooperating parts to control the pivotal action of said members, and means to eliminate friction between said cooperating parts.

54. In a scale, a movable bearing, means to cause said bearing to move in a substantially straight line, an indicating member pivotally mounted on said bearing, means to control the pivotal action of said indicating member, and means to establish the center of gravity of said indicating member at the axis thereof, thereby eliminating friction in said controlling means.

55. In a scale, a movable bearing, a supporting member pivotally mounted on said bearing, and means to establish the center of gravity of said member at the axis thereof, whereby pivotal action of said member may be controlled without friction, and a part carried by said supporting member.

56. In a scale, a movable structure, pivotally mounted on a fixed axis, a supporting member pivotally mounted upon said structure and movable therewith, an indicating member pivotally mounted on said supporting member, and means to establish the center of gravity of each of said members at the axis thereof, whereby the pivotal action of each of said members may be controlled without friction.

57. In a scale, a weight actuated member, an indicating member, a supporting member upon which said indicating member is pivotally mounted, a movable bearing upon which said supporting member is pivotally mounted, means controlled by said weight actuated member to actuate said bearing, and means to cause the axis of said indicating member to move in a substantially straight line.

58. In a scale, a weight actuated member, an indicating member, a supporting member upon which said indicating member is pivotally mounted, a movable bearing upon which said supporting member is pivotally mounted, means controlled by said weight actuated member to actuate said bearing, means for controlling the radial position of said indicating member about its axis, and means to cause the axis of said indicating member to move in a substantially straight line.

59. In a scale, a weight actuated member, an indicating member, a supporting member upon which said indicating member is pivotally mounted, a movable bearing upon which said supporting member is pivotally mounted, means controlled by said weight actuated member to actuate said bearing, means for controlling the radial position of said indicating member about its axis, and means to cause the axis of said indicating member to move in a substantially straight line, said indicating member and said supporting member having their centers of gravity established at their respective axes.

60. In a scale, a movable structure, a supporting member pivotally mounted on said structure, an indicating member pivotally mounted on said supporting member, means to control the pivotal action of said supporting member, and means to control the pivotal action of said indicating member, said members being so arranged as to normally prevent them from exerting pressure upon the respective controlling means.

61. In a scale, a movable structure, a supporting member pivotally mounted on said structure, an indicating member pivotally mounted on said supporting member, and means to control the pivotal action of said members, said members being so arranged as to normally eliminate pressure on said controlling means.

62. In a scale, a base, a supporting member carried by said base, means for causing a part of said supporting member to move in a substantially straight line, an indicating member pivotally mounted on said part of said supporting member and having its center of gravity established at the axis thereof, and means to control the pivotal action of said indicating member.

63. In a scale, a pivoted indicating member, having its center of gravity established at the axis thereof, a pivoted supporting member upon which said indicating member is mounted, the center of gravity of said supporting member and the indicating member carried thereby being established at the axis of said supporting member, a movable structure upon which said supporting member is mounted, means to control the pivotal action of said indicating member, and means to control the pivotal action of said supporting member.

64. In a scale, a pivoted indicating member having its center of gravity established at the axis thereof, a pivoted supporting member having its center of gravity established at the axis thereof and upon which said indicating member is mounted, a movable structure upon which said supporting member is mounted, and means to control the pivotal action of said members.

65. In a scale, a pivoted indicating member, having its center of gravity established at the axis thereof, a bodily movable supporting member upon which said indicating member is mounted, means to control the pivotal action of said indicating member, and means to actuate said supporting member.

66. In a scale, a pivoted indicating member having its center of gravity established at the axis thereof, a pivoted supporting member having its center of gravity established at the axis thereof and upon which said indicating member is mounted, a movable structure upon which said supporting member is mounted, means to control the pivotal action of said indicating member, means to control the pivotal action of said supporting member, and means to actuate said structure.

67. In a scale, a pivoted indicating member having its center of gravity established at the axis thereof, a pivoted supporting member having its center of gravity established at the axis thereof and upon which said indicating member is mounted, a movable structure upon which said supporting member is mounted, means to control the pivotal action of said members, and means to actuate said structure.

68. In a scale, a base, a movable bearing supported by said base for movement in a straight line, and an indicating member pivotally mounted on said bearing, and means to control the pivotal action of said indicating member, said indicating member having its center of gravity established at the axis thereof to eliminate friction in said controlling means.

69. In a scale, a weight actuated member, an elongated chart having value graduations, means controlled by said weight actuated member to impart movement to said chart transversely to its length, an indicating member normally extending lengthwise of said chart, a support for said indicating member, a pivot pin rigidly secured to said support, bearings for said pivot pin, an arm loosely mounted on said pivot pin and having a laterally extending portion, adjustable stops carried by said supporting member and arranged on opposite sides of said part of said arm to control the position of said arm in relation to said supporting member, and a receptacle mounted for movement and operatively connected with said arm.

In testimony whereof, I affix my signature hereto.

WILLIAM R. MITTENDORF.